United States Patent
Schmid et al.

(10) Patent No.: US 6,470,249 B1
(45) Date of Patent: Oct. 22, 2002

(54) VEHICLE OCCUPANT PROTECTION SYSTEM FOR A MOTOR VEHICLE AND METHOD FOR CONTROLLING THE TRIGGERING OF THE VEHICLE OCCUPANT PROTECTION SYSTEM

(75) Inventors: Gerhard Schmid, Regensburg; Gerhard Mader, Thalmassing; Derrick Zechmair, Tegernheim, all of (DE)

(73) Assignee: Siemens Aktiengesellschaft, Munich (DE)

( * ) Notice: Subject to any disclaimer, the term of this patent is extended or adjusted under 35 U.S.C. 154(b) by 47 days.

(21) Appl. No.: 09/654,371

(22) Filed: Sep. 1, 2000

Related U.S. Application Data

(63) Continuation of application No. PCT/DE99/00560, filed on Mar. 3, 1999.

(30) Foreign Application Priority Data

Mar. 13, 1998 (DE) .......................... 198 11 070

(51) Int. Cl.⁷ .............................. B60R 21/32
(52) U.S. Cl. .................. 701/45; 340/436; 280/735
(58) Field of Search .................. 701/45, 46, 70, 701/47; 340/467, 669, 436, 438; 324/162; 180/268, 271, 282; 280/735; 73/488; 702/141

(56) References Cited

U.S. PATENT DOCUMENTS

| | | | |
|---|---|---|---|
| 5,409,258 A | * | 4/1995 | Kawabata .................. 280/735 |
| 5,433,101 A | | 7/1995 | Spangler et al. ............. 73/1 D |
| 5,646,454 A | | 7/1997 | Mattes et al. ............... 307/10.1 |
| 5,726,887 A | | 3/1998 | Spies et al. ........... 280/242.034 |

* cited by examiner

Primary Examiner—William A. Cuchlinski, Jr.
Assistant Examiner—Arthur D. Donnelly
(74) Attorney, Agent, or Firm—Laurence A. Greenberg; Werner H. Stemer; Ralph E. Locher

(57) ABSTRACT

A motor vehicle occupant protection system and a method for triggering the system include an accident sensor and a control device. The latter controls system triggering as a function of a sensor output signal. The control device has an input terminal connected via a communication line to a sensor status signal output terminal. In the system and method, the sensor has internally checks errors at regular and/or irregular intervals, and, upon detection, permanently generates a status signal for the control device, which checks the status before triggering a vehicle occupant protection system when it receives a signal fulfilling system triggering criteria. The control device enables/disables the triggering as a function of the check result. Specifically, the control device disables the firing standby state and generates a warning signal. In the event of an accident, before the vehicle occupant protection system is fired, the status signal is interrogated once more, i.e., sensor status is checked. If the accident sensor does not signal an error, the triggering takes place, but otherwise it is disabled. As a result, undesired triggering of the vehicle occupant protection system can be avoided.

20 Claims, 2 Drawing Sheets

VEHICLE OCCUPANT PROTECTION SYSTEM FOR A MOTOR VEHICLE AND METHOD FOR CONTROLLING THE TRIGGERING OF THE VEHICLE OCCUPANT PROTECTION SYSTEM

CROSS-REFERENCE TO RELATED APPLICATION

This application is a continuation of International Application No. PCT/DE99/00560, filed Mar. 3, 1999, which designated the United States.

BACKGROUND OF THE INVENTION

FIELD OF THE INVENTION

The invention lies in the field of vehicle occupant protection systems. The invention relates to a vehicle occupant protection system for a motor vehicle having at least one accident sensor and one control device that controls the triggering of the vehicle occupant protection system as a function of the sensor output signal. The accident sensor registers a parameter that characterizes an accident, in particular, an acceleration of a motor vehicle, an angle of inclination of a motor vehicle, and/or a rolling movement. If predefined limiting values are reached, the control device actuates the triggering of the vehicle occupant protection system. The vehicle occupant protection system may be embodied as an airbag system, a seat belt pretensioning system, a rollover bar triggering system, or in some other way.

However, if the output signal generated by the accident sensor was incorrect, there is a risk that an unnecessary and very undesirable triggering of the vehicle occupant protection system occurs, or that a necessary triggering does not occur.

German Published, Non-Prosecuted Patent Application DE 43 44 284 A1 discloses a semiconductor acceleration measuring device that is suitable, for example, for use in vehicles. The device has an acceleration sensor and a diagnostic circuit that checks whether or not the output signal generated by the acceleration sensor and amplified by an amplifier circuit is abnormal. The device is mounted on the measuring projection of the sensor.

German Published, Non-Prosecuted Patent Application DE 37 06 765 A1 discloses a motor vehicle impact sensor that is connected to a test circuit and that has an acceleration sensor. For a function test, an electro-acoustic transducer disposed in the sensor housing subjects the acceleration sensor to sound waves. The electrical signals that are generated by the acceleration sensor in reaction thereto are checked in an evaluation and triggering circuit. The check can be carried out before a journey starts, and also at regular time intervals during the journey.

German Published, Non-Prosecuted Patent Application DE 44 24 020 A1, corresponding to U.S. Pat. No. 5,726,887 describes a test method for a vehicle occupant protection system in which test pulses that are registered by downstream signal-conditioning and control components and are evaluated to check functions, are applied to the output line of the collision sensor.

German Published, Non-Prosecuted Patent Application DE 43 16 263 A1 discloses a method for diagnosing the operational capability of an acceleration sensor in which a diagnostic voltage is applied to a fixed electrode of the acceleration sensor. The resulting deflection of a movable electrode is registered and evaluated.

SUMMARY OF THE INVENTION

It is accordingly an object of the invention to provide a vehicle occupant protection system for a motor vehicle and method for controlling the triggering of the vehicle occupant protection system that overcomes the hereinafore-mentioned disadvantages of the heretofore-known devices and methods of this general type and that reduces the risk of triggering errors in the vehicle occupant protection system controller.

With the foregoing and other objects in view, there is provided, in accordance with the invention, a vehicle occupant protection system for a motor vehicle, including an accident sensor for registering an operating parameter that signals an accident, the accident sensor having an internal error-checking function, a sensor output signal terminal for carrying a sensor output signal, and a status signal output terminal for outputting a status signal, and a control device for controlling a triggering of a vehicle occupant protection system as a function of the sensor output signal, the control device connected to the accident sensor through the sensor output signal terminal, the control device having an input terminal connected to the status signal output terminal of the accident sensor through a line, the internal error-checking function of the accident sensor permanently outputting a status signal to the control device when an internal error is registered.

In accordance with an added feature of the invention, the accidence sensor is an acceleration sensor.

In accordance with an additional feature of the invention, the accident sensor registers an operating parameter that signals a motor vehicle acceleration.

The accident sensor is equipped with an error-checking function for detecting internal errors and, when an error is detected, it permanently outputs a status signal to the superordinate control device. The control device can, thus, detect, at any time, whether or not the sensor output signal that is generated by the accident sensor and that represents the monitored parameter (for example, the acceleration), is incorrect. Then, the control device can initiate suitable protective measures, for example, generate an audible and/or visible warning for the driver and can further refrain from evaluating the sensor output signal. The accident sensor is provided with an additional status signal output terminal that is specially reserved for outputting the status signal. The output terminal is connected to a terminal of the control device through a separate line. Thus, the status signal can be transmitted to the control device on a separate line and, therefore, be interrogated independently of, and in addition to, the actual sensor output signal. The interrogation frequency is preferably lower than the interrogation clock rate of the sensor output signal so that the additional loading of the control device that is caused by the status signal interrogation remains low. The accident sensor can also have a test terminal through which the control device can actively supply, in a start phase, a test signal for a function test.

In accordance with another feature of the invention, the control device has an input/output terminal through which the control device outputs a test signal to the accident sensor during a test phase.

In accordance with a further feature of the invention, the control device periodically interrogates the status signal.

The accident sensor also permanently stores a status signal that occurs only briefly. The information may be helpful during subsequent maintenance and/or diagnosis of the accident sensor and/or may also bring forward maintenance/diagnosis of the accident sensor.

The error-checking function can, for example, be an error-detection check performed on sensor operating control data that is read out of a sensor memory. The sensor operating control data can, for example, be provided with a parity bit. As such, the sensor carries out a parity check while the sensor operating control data is read out, and generates the status signal if the parity check happens to generate a data error. The error-checking function can, however, also be configured to check internal mechanical and/or electrical defects in the sensor.

A still further improved degree of protection against undesired triggering caused by sensor errors can be obtained by interrogating the sensor status signal once more just before actual triggering of the vehicle occupant protection system (due to a sensor output signal that signals an accident). The vehicle occupant protection system is triggered only if the condition of the status signal indicates that the accident sensor is operating free of errors, otherwise it is disabled.

With the objects of the invention in view, there is also provided a method for controlling the triggering of a vehicle occupant protection system, that includes performing an internal error check at regular and/or irregular intervals with an accident sensor, outputting, with the accident sensor, a status signal to a control device through a status signal output terminal when an error is detected, checking, with the control device, a status of the status signal before triggering a vehicle occupant protection system when the control device receives from the accident sensor a sensor output signal that fulfills triggering criteria for triggering a vehicle occupant protection system, and the control device enabling or disabling the triggering as a function of the result of the check. The method can be applied with the vehicle occupant protection system according to the invention.

In accordance with a concomitant mode of the invention, the control device at least one of disables future triggering of the vehicle occupant protection system when the status signal is received and generates at least one of a visual and audible warning when the status signal is received.

Other features that are considered as characteristic for the invention are set forth in the appended claims.

Although the invention is illustrated and described herein as embodied in a vehicle occupant protection system for a motor vehicle and method for controlling the triggering of the vehicle occupant protection system, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
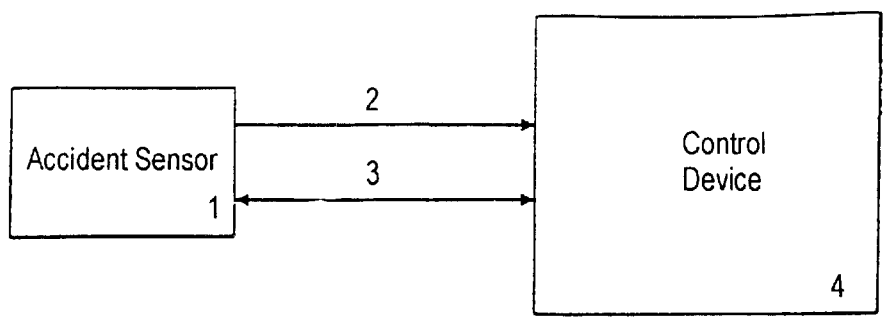
FIG. 1 is a block circuit diagram of a circuit configuration according to the invention.

In all the figures of the drawing, sub-features and integral parts that correspond to one another bear the same reference symbol in each case.

Referring now to the figures of the drawings in detail and first, particularly to FIG. 1 thereof, there is shown an accident sensor 1 that is connected to a control device 4 through two lines 2 and 3. The control device 4 is embodied as a microcontroller and is connected through non-illustrated lines to one or more firing caps of the vehicle occupant protection system. The control device 4 receives the sensor output signal from the accident sensor 1 through the line 2. The sensor output signal either represents the magnitude of the monitored parameter (for example, vehicle acceleration) in analog form or is output in the form of a digital signal with two levels (on/off). The sensor output signal is present at a respective input terminal of the control device 4 and is interrogated cyclically with a high frequency, for example 4 kHz. Thus, an accident (one which is imminent or one which has already occurred) that is signaled by the accident sensor 1 can be detected as quickly as possible and the vehicle occupant protection system can be triggered.

In the exemplary embodiment illustrated, the accident sensor 1 is an acceleration sensor. However, it is also possible to use one (or more) accident sensors of different types, for example an inclination switch, a rolling movement detector, a mechanically switching inertia switch, or the like. In the exemplary embodiment, the accident sensor 1 is an integrated acceleration sensor with self-test function. The sensor is connected directly to the control device 4. During a start phase, which is carried out, for example, after the motor vehicle starts, the control device 4 generates, at its terminal connected to the line 3, a pulse 7 (see FIG. 2, curve c) that is applied to the test terminal (status signal output terminal) of the accident sensor 1. The test terminal is connected to the line 3. The voltage signal, which has a high level in the example shown, artificially excites the accident sensor 1, specifically, for example, it deflects the seismic mass of the accident sensor 1 so that, when it is functioning correctly, the accident sensor 1 generates at its output connected to the line 2 an output signal that indicates this condition, that is to say switches over the output signal level. The control device 4 evaluates the sensor output signal that is output on the line 2 and, as a result, checks the correct function of the accident sensor 1.

Figure 2:
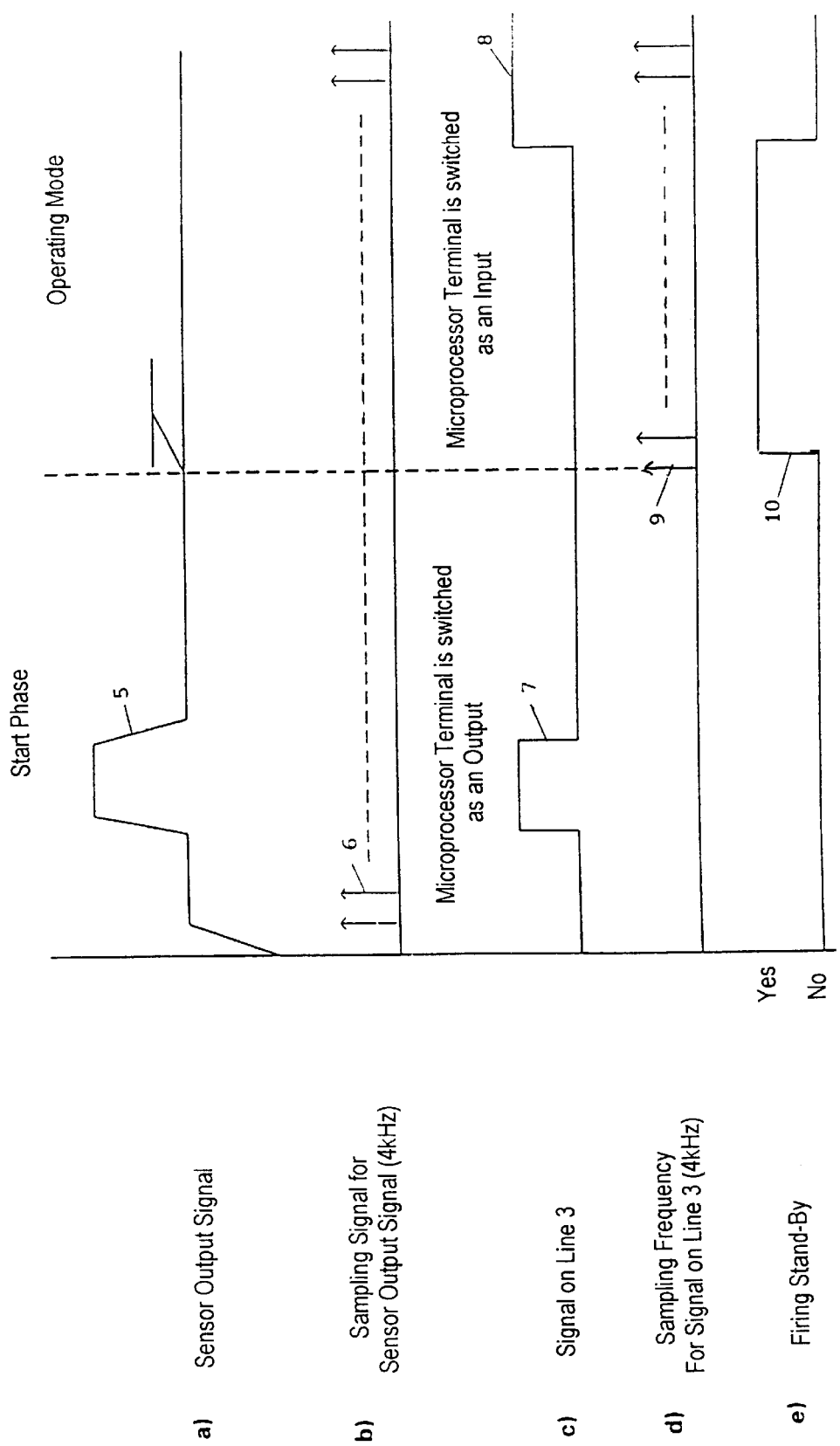
FIG. 2 is a diagram detailing signal profiles that occur with the circuit of FIG. 1.

In FIG. 2, curve a, the response signal generated by the sensor given a correct method of operation on the line 2 is designated by the reference numeral 5. The start phase corresponds in FIG. 2 to the time range shown to the left of the vertical dashed line.

In the exemplary embodiment illustrated, the accident sensor 1 is a capacitive acceleration sensor embodied as a capacitor with two fixed capacitor plates and a movable center plate disposed between the two fixed capacitor plates. The voltage (pulse 7) that is fed through the line 3 during the self-test deflects the movable center plate, serving as seismic mass, of the capacitor by electrostatic attraction. Thus, the center plate moves in a way similar to that caused when the motor vehicle severely decelerates due to an (imminent) accident. As a result, the internal capacitance values change clearly. The sensor evaluates these changes in capacitance internally, for example, after amplification of the very weak internal signals caused by the change in capacitance, and then generates, on the line 2, the corresponding analog or digital sensor output signal with the profile shown in FIG. 2, line a (pulse 5).

Depending on the configuration, the accident sensor 1 has different internal functions. The accident sensor 1 is configured according to the invention such that it can internally check one or more of these internal functions automatically (at regular or irregular intervals). The accident sensor 1 contains, for example, an internal memory, in particular, an EPROM, in which control data, that controls the sensor operation and that can be output while the sensor is operating, is stored. The control data can, for example, represent the amplification factor provided for the amplification of the internal capacitive measurement signal and/or calibration data that defines the offset value necessary for the correct internal signal processing, or the amplification. The sensor operating control data, for example, calibration data, is preferably written to the memory at the manufacturer before the acceleration sensor is delivered, but it can also be updated later in order to adapt it to a modified response behavior. According to the invention, the control data is written to the memory together with an error-detection code, in the simplest case, a parity bit. After the control data is read out, the accident sensor 1 internally carries out an error-detecting check, for example, a parity check, so that it can detect data errors that are caused by incorrectly stored control data and/or reading errors occurring during the reading process.

The accident sensor 1 is connected through an internal electrical circuit, for example a transistor, to its test terminal, which is connected to the line 3 and, thus, can actively control the potential on the line 3. If it detects an internal function error, it switches over (for example, by activating the internal transistor connected to the test terminal) the potential on the line 3 and, thus, generates a status signal (signal 8 in FIG. 2, line c) that is supplied to the control device 4.

It is also possible that the sensor terminal provided for the start phase test is not used to generate the status signal. Rather, a further sensor output that is connected to an appropriate terminal of the control device 4 is used.

The internal error-checking function provided in the accident sensor 1 could alternatively be used to monitor other parameters. If the accident sensor 1 is equipped, for example, with an internal clock signal transmitter, the accident sensor can be embodied to compare the clock signal frequency with predefined values and, in the event of deviations from a permitted frequency range, to generate the status signal. In addition, the accident sensor can be provided, for example, with a signal filter and can check the correct filter function intermittently. The accident sensor 1 can also be configured to detect internal mechanical defects in the scope of its error-checking function. In the case of a piezoresistive accident sensor, a problem can occur, for example, the silicon-bending bar that is bent as a function of acceleration can break. Within the scope of the sensor's error-checking function, the sensor can detect the broken state of the silicon bending bar (for example, based on the greatly changed internal signal conditions or by a measurement section that is specially provided for checking the condition of the bending bar), and can generate the status signal when errors are detected.

The invention is, of course, also capable of being used in accident sensors that are configured differently, for example, in piezoelectric sensors that are equipped with an appropriate internal error-checking function that checks mechanical and/or electrical functional errors and signals such errors if appropriate.

The accident sensor 1 is configured to generate, when a functional error is detected, not only the status signal as quickly as possible but also to generate it permanently even if the registered error is only of a temporary nature or has, for example, only occurred for a short period. This can be achieved by equipping the accident sensor with a flip-flop or a functionally similar component whose set input is activated when an internal error is registered, resulting in the permanent change of the flip-flop output signal level. The output signal is output to the sensor terminal that is provided for the outputting of the status signal.

Even errors that occur spontaneously and only temporarily, thus, lead to the permanent outputting of the status signal that indicates the internal functional error.

In the exemplary embodiment shown in the drawings, after the self-test start phase (time range to the left of the dashed vertical line in FIG. 2) has been concluded, the system switches over to the operating mode (time range to the right of this vertical line). In the operating mode, the terminal of the control device 4 that is connected to the line 3 is now switched as an input terminal, and can, thus, receive a status signal generated by the accident sensor 1 through the line 3.

As is clear from FIG. 2, line b, the control device 4 cyclically interrogates its input terminal, connected to the line 2, at a high frequency of, for example, 4 kHz. The symbolically illustrated interrogation pulses 6 that have also already been generated in the start phase represent the cyclic interrogation. In contrast, as shown in FIG. 2, line d, the terminal of the control device 4 that is connected to the line 3 is not interrogated until there is a switchover to the operating mode. Then, it is interrogated with a significantly lower frequency of, for example, 2.5 Hz, that is to say every 400 ms. The interrogation pulses for the status signal are designated in FIG. 2, line d, by reference numeral 9.

The signal that occurs on the line 3 is represented in FIG. 2, line c. The control device 4 generates the self-test pulse 7 during the start phase, as stated.

As soon as the accident sensor 1 detects an internal functional error during the operating phase, it permanently switches, as status signal, the previously low level of the line 3 to a high level. The switch is illustrated by the signal element 8. As soon as the control device 4 has detected the high level of the status signal 8 at the next interrogation pulse 9, the control device 4 reacts by shutting off the firing standby state to subsequently prevent further triggering of the vehicle occupant protection system. The firing standby state is illustrated in FIG. 2, line e, by the curve 10. The firing standby state starts with the start of the operating phase and is terminated again in response to the registration of the rising edge of the status signal 8. At the same time, a warning lamp that is mounted in the driver's region of the motor vehicle at a visible location can also be illuminated permanently by the control device 4 (airbag control unit). Alternatively, or in addition, an audible alarm, which indicates the absence of the firing standby state of the vehicle occupant protection system, may also be generated.

As long as the firing standby state is present, the control device 4 evaluates, in accordance with the internally predefined triggering algorithm, the sensor output signal that is supplied by the accident sensor 1 through the line 2. If the signal that is supplied on the line 2 signals an accident, the control device 4 carries out the firing routine illustrated in FIG. 3. First, at a step S1, the control device 4 interrogates the signal present on the line 3, that is to say the control device 4 checks once more before the firing, independently of the time sequence predefined by the sampling pulses 9, whether or not the accident sensor 1 actually signals "OK" status (low output level at the test terminal of the accident sensor 1). If the check in the step S1 reveals that the accident sensor 1 is not signaling an error, the system goes to step S2 at which the firing switch or switches is/are closed and the firing cap or caps of the vehicle occupant protection system are, thus, activated. However, if it should become apparent in step S1 that the accident sensor 1 is signaling an error, the system goes to step S3 at which firing is not triggered. Instead, the firing standby state of the control unit is switched off and the warning lamp is triggered. In such a case, it is assumed that an internal sensor error has merely caused the output signal emitted by the accident sensor 1 on the line 2, for example, by a bit that has been incorrectly read out of the internal memory (EPROM).

After step S2 or S3, the firing routine is terminated and the system returns to the interrupted main program.

Figure 3:
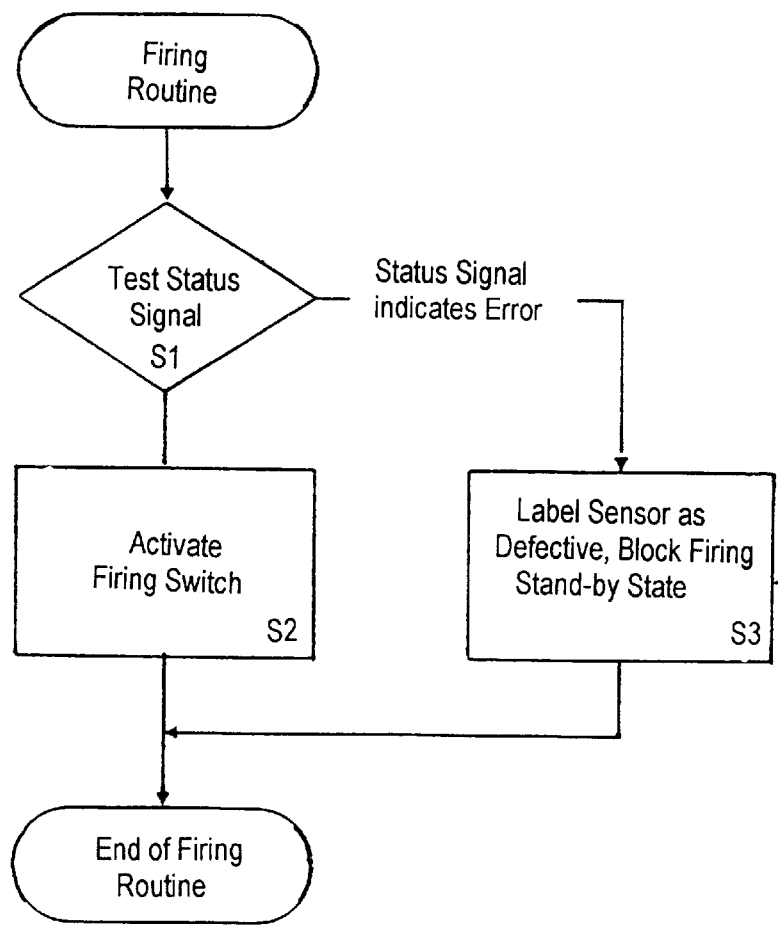
FIG. 3 is a flowchart of an embodiment of the method according to the invention.

The procedure shown in FIG. 3 enables prevention of undesired firing of the vehicle occupant protection system.

We claim:

1. A vehicle occupant protection system for a motor vehicle, comprising:
    an accident sensor for registering an operating parameter signaling an accident, said accident sensor having an internal error-checking function, a sensor output signal terminal for carrying a sensor output signal, and a status signal output terminal for outputting a status signal;
    a line; and
    a control device for controlling a triggering of a vehicle occupant protection system as a function of the sensor output signal, said control device connected to said accident sensor through said sensor output signal terminal, said control device having an input terminal connected to said status signal output terminal of said accident sensor through said line, said internal error-checking function of said accident sensor permanently outputting a status signal to said control device when an internal error is registered.

2. The vehicle occupant protection system according to claim 1, wherein said accident sensor has a test terminal connected to said control device.

3. The vehicle occupant protection system according to claim 1, wherein said control device has an input/output terminal through which said control device outputs a test signal to said accident sensor during a test phase.

4. The vehicle occupant protection system according to claim 2, wherein said control device has an input/output terminal through which said control device outputs a test signal to said test terminal of said accident sensor during a test phase.

5. The vehicle occupant protection system according to claim 1, wherein said control device periodically interrogates the status signal.

6. The vehicle occupant protection system according to claim 1, wherein said control device interrogates the status signal with a lower frequency than the sensor output signal generated by said accident sensor.

7. The vehicle occupant protection system according to claim 5, wherein said control device interrogates the status signal with a lower frequency than the sensor output signal generated by said accident sensor.

8. The vehicle occupant protection system according to claim 1, wherein said accident sensor has a memory for storing sensor operating control data, and said accident sensor carries out an error detection check when the sensor operating control data is read out and generates the status signal when an error is detected.

9. The vehicle occupant protection system according to claim 8, wherein said accident sensor carries out a parity check when the sensor operating control data is read out.

10. The vehicle occupant protection system according to claim 1, wherein said accident sensor is an acceleration sensor.

11. The vehicle occupant protection system according to claim 1, wherein said accident sensor registers an operating parameter signaling a motor vehicle acceleration.

12. A method for controlling the triggering of a vehicle occupant protection system, which comprises:
    performing an internal error check at intervals with an accident sensor;
    outputting, with the accident sensor, a status signal to a control device through a status signal output terminal when an error is detected;
    checking, with the control device, a status of the status signal before triggering a vehicle occupant protection system when the control device receives from the accident sensor a sensor output signal fulfilling triggering criteria for triggering a vehicle occupant protection system; and
    selectively enabling and disabling the triggering with the control device as a function of the result of the check.

13. The method according to claim 12, which further comprises at least one of disabling future triggering of the vehicle occupant protection system with the control device when the status signal is received and generating at least one of a visual and audible warning with the control device when the status signal is received.

14. The method according to claim 12, which further comprises disabling future triggering of the vehicle occupant protection system with the control device when the status signal is received.

15. The method according to claim 12, which further comprises generating at least one of a visual and audible warning with the control device when the status signal is received.

16. The method according to claim 12, wherein the performing step comprises performing an internal error check at regular intervals.

17. The method according to claim 12, wherein the performing step comprises performing an internal error check at irregular intervals.

18. A method for controlling the triggering of a vehicle occupant protection system for a motor vehicle, which comprises:
    providing an accident sensor for registering an operating parameter that signals an accident, the accident sensor having an internal error-checking function, a sensor output signal terminal for carrying a sensor output signal, and a status signal output terminal for outputting a status signal;
    providing a control device for controlling a triggering of a vehicle occupant protection system as a function of the sensor output signal;
    connecting an input terminal of the control device to the status signal output terminal of the accident sensor with a line;
    connecting the control device to the accident sensor through the sensor output signal terminal;
    performing an internal error check at intervals with the accident sensor;
    outputting, with the accident sensor, the status signal to the control device through the status signal output terminal when an error is detected;
    checking, with the control device, a status of the status signal before triggering the vehicle occupant protection system when the control device receives from the accident sensor a sensor output signal that fulfills triggering criteria for triggering the vehicle occupant protection system; and selectively enabling and disabling the triggering with the control device as a function of the result of the check.

19. A vehicle occupant protection system, comprising:

an accident sensor for registering and outputting an accident signal indicating an accident and for outputting a sensor status signal, said accident sensor having a fault tester for registering the sensor status signal; and a controller for administering a vehicle occupant protection system trigger based upon the accident signal, said controller connected to said accident sensor, said fault tester permanently outputting a fault sensor status signal when an accident sensor fault is registered.

20. A method for controlling the triggering of a vehicle occupant protection system, which comprises:

performing an internal error check with an accident sensor;

outputting, with the accident sensor, a status signal when an error is detected;

after the accident sensor transmits a signal fulfilling triggering criteria for triggering a vehicle occupant protection system, checking a status of the status signal before triggering a vehicle occupant protection system; and controlling the triggering based upon a result of the status check.

\* \* \* \* \*